United States Patent
Grytzelius et al.

[11] Patent Number: 6,098,004
[45] Date of Patent: Aug. 1, 2000

[54] PREVENTING GEAR HUNTING IN AN AUTOMATIC TRANSMISSION FOR A MOTOR VEHICLE

[75] Inventors: Bryant David Grytzelius, Westland; Bruce Kinston Lyon, South Lyon; Joseph James Gallo, Fraser; John Paul Gorys, Canton; Jeffrey James Tumavitch, Livonia; Paul Christian Stallman, Canton; Stephanie Ann Skown, Novi, all of Mich.

[73] Assignee: Ford Global Technologies, Inc., Dearborn, Mich.

[21] Appl. No.: 09/090,542

[22] Filed: Jun. 4, 1998

[51] Int. Cl.[7] .............................. G06F 17/00; G06F 19/00
[52] U.S. Cl. .................. 701/55; 701/64; 701/79; 701/95; 477/120; 477/130; 477/154
[58] Field of Search .................. 701/51, 54, 55, 701/58, 64, 70, 74, 79, 84, 85, 95, 101, 110; 477/120, 123, 130, 148, 154, 155, 156; 475/51, 123; 180/364, 374

[56] References Cited

U.S. PATENT DOCUMENTS

| | | | |
|---|---|---|---|
| 4,285,252 | 8/1981 | Yamaki et al. | 477/120 |
| 4,335,418 | 6/1982 | Clement | 361/152 |
| 4,380,048 | 4/1983 | Kishi et al. | 701/56 |
| 4,551,802 | 11/1983 | Smyth | 701/55 |
| 4,852,006 | 7/1989 | Speranza | 701/55 |
| 4,897,790 | 1/1990 | Bieber | 701/56 |
| 4,943,221 | 7/1990 | Friesen | 425/73 |
| 4,943,921 | 7/1990 | Baltusis et al. | 701/55 |
| 4,947,331 | 8/1990 | Speranza | 701/55 |
| 5,016,175 | 5/1991 | Baltusis et al. | 701/58 |
| 5,166,879 | 11/1992 | Greene et al. | 701/62 |
| 5,241,476 | 8/1993 | Benford et at. | 701/58 |
| 5,305,663 | 4/1994 | Leonard et al. | 475/123 |
| 5,669,850 | 9/1997 | Dourra et al. | 477/108 |

*Primary Examiner*—William A. Cuchlinski, Jr.
*Assistant Examiner*—Gertrude Arthur
*Attorney, Agent, or Firm*—Frank G. McKenzie

[57] ABSTRACT

In an automotive transmission, a method for determining whether an upshift should be enabled or disabled determines the predetermined upshift vehicle speed at which the upshift is scheduled to occur with reference to current throttle position and vehicle speed. The method employs the difference between upshift vehicle speed and current vehicle speed, the current vehicle acceleration, an empirically determined upshift vehicle acceleration referenced to current vehicle speed and the speed difference. If the current vehicle acceleration is equal to or greater than upshift vehicle acceleration, the upshift is enabled; otherwise, the scheduled upshift is disabled.

7 Claims, 5 Drawing Sheets

PREVENTING GEAR HUNTING IN AN AUTOMATIC TRANSMISSION FOR A MOTOR VEHICLE

BACKGROUND OF THE INVENTION

1. Field of the Invention

This invention relates to the field of controlling gear ratio changes in an automatic transmission. More particularly, it pertains to a technique for preventing powertrain hunting, i.e., gear hunting in such transmissions.

2. Description of the Prior Art

The invention relates generally to automotive transmission controls of the type disclosed in U.S. Pat. No. 4,943,921 and U.S. Pat. No. 5,016,175.

In an electronically controlled, variable speed automatic transmission, the current gear ratio is determined on the basis of a schedule relating vehicle speed to throttle position, the schedule being stored in electronic memory accessible to a microprocessor. The schedule defines boundaries between operating conditions defined by vehicle speed and throttle position, each boundary separating an operating range for a particular gear ratio from an adjacent range where a different gear ratio is the appropriate gear ratio. Generally, the shift schedule for each gear ratio produces a reference vehicle speed, the dependent variable, when memory is addressed with the current throttle position, the independent variable. The reference vehicle speed is compared to current vehicle speed periodically so that upshifts and downshifts from the current gear occur when vehicle speed rises above or falls below the vehicle speed at which a gear ratio change from the current gear is to occur according to the schedule.

However, when moving from a flat road to an inclined surface, vehicle speed declines if throttle position is maintained. Thereafter, in order to maintain vehicle speed, the throttle is opened by depressing an accelerator pedal. Typically, this action produces a downshift to a lower operating gear ratio where greater torque is delivered to the drive wheels of the vehicle. Consequently, vehicle speed increases. But if vehicle speed thereafter exceeds the desired vehicle speed, the operator partially closes the throttle, thereby inducing an upshift to a higher gear ratio where drive wheel torque decreases and vehicle speed drops.

Operation of the transmission in combination with the engine throttle in this manner is called "hunting", a cyclic repetition of gear shifts between adjacent gear ratios with corresponding changes in vehicle speed.

A similar condition can occur when moving from a flat road to a declining slope, vehicle speed can be maintained by partially releasing the accelerator pedal, but this usually produces an upshift to a higher gear ratio and an increase in vehicle speed.

Operating conditions other than a change in road grade can cause an automatic transmission to cycle or hunt between gear ratios. Changes in atmospheric pressure due to changes in altitude from that corresponding to the shift schedule; a substantial change in vehicle load from the gross weight corresponding to the shift schedule, such as when pulling a heavy trailer; degradation in engine condition; and a substantial elevated ambient temperature can induce powertrain hunting.

Various techniques have been devised to avoid this problem. For example, U.S. Pat. No. 4,335,418 describes a technique for detecting increased engine load when running on a slope and determining the appropriate gear ratio in accordance with the magnitude of the loading associated with the inclination of the slope. Slope detecting reference data, indicative of vehicle speeds for various ranges of slope correspond to throttle openings in different gear ratios, are used to detect presence of the slope by comparing the actual gear ratio, the throttle opening, vehicle speed, against the slope detecting reference data.

Signals indicative of the shift lever position, vehicle speed and throttle opening are applied as input to a microprocessor, a slope detecting program determines presence of the slope from these data and modifies standard shift data to produce shift reference data, which is then written into memory. By comparing the current gear ratio throttle opening and vehicle speed against corresponding reference data, a speed ratio is determined and used to energize solenoid valves to produce gear ratio changes in accordance with the control programs.

The gear shift control of U.S. Pat. No. 4,285,252 uses a stored schedule of vehicle acceleration and a comparison between actual vehicle acceleration to the stored value to change scheduled gear shift in accordance with differences between stored and actual vehicle acceleration. The control includes a first schedule of gear shift changes suitable when the vehicle is traveling on a flat road and a second schedule for gear changes suitable for an uphill road. On the basis of a stored schedule of vehicle accelerations, reference to throttle position and actual vehicle acceleration, the slope of the grade is determined, and a gear shift schedule corresponding to the slope is selected to control gear shifts while on the grade.

The gear shift control of U.S. Pat. No. 4,380,048 relies on a average value of engine load and vehicle speed to determine a programmed acceleration, which is compared to actual acceleration to determine whether a transmission shift characteristic is to be selected.

The gear shift control of U.S. Pat. No. 4,897,790 intentionally skips selected drive ratios on the basis of perceived driving conditions and modifies the scheduled gear ratio change on the basis of vehicle acceleration.

SUMMARY OF THE INVENTION

It is preferable that a gearshift control for automotive use should automatically prevent frequent, needless shifting. Lengthy computation time required for a microprocessor to determine that a scheduled gearshift will produce powertrain hunting or to establish an acceptable alternative should be avoided. Gearshift control techniques in the prior art require excessive computation time and unacceptably large memory capacity.

It is a principal object of this invention to control upshifts in an automatic transmission upon considering the same operating parameters, viz. vehicle acceleration, vehicle speed and throttle position, as an operator of a vehicle having a manual transmission would consider when deciding whether to upshift. Consequently, in accordance with the control method of this invention, the closer vehicle speed is to a predetermined upshift vehicle speed, the higher vehicle acceleration must be before an upshift can occur.

It is an another object of this invention to reduce the frequency of upshifts in a multiple-speed, electronically controlled automatic transmission. It is yet another object to reduce the magnitude of thermal stress in clutch components due to frequent gear ratio changes and to avoid premature wear of those clutch components.

A method for controlling a gear ratio change in an automatic transmission adapted for use with an engine having a throttle includes the steps of determining the current throttle position, current vehicle speed, and current vehicle acceleration; determining an upshift vehicle speed corresponding to current throttle position at which an upshift from the current gear may occur; determining a speed difference between current vehicle speed and said upshift vehicle speed; if current vehicle speed is greater than the upshift vehicle speed, determining an upshift vehicle acceleration corresponding to said speed difference and current vehicle speed; if the upshift vehicle acceleration is greater than the current vehicle acceleration, enabling an upshift to occur; and if the upshift vehicle acceleration is not greater than the current vehicle acceleration, preventing an upshift.

BRIEF DESCRIPTION OF THE DRAWINGS

FIG. 4 is a function in the form of a lookup table of vehicle acceleration values indexed to vehicle speed and delta vehicle speed.

FIGS. 5 and 6 are diagrams of a control algorithm for enabling and disabling lockup of the torque converter bypass clutch of the transmission of FIG. 1.

FIG. 7 illustrates calibrated periods indexed to vehicle speed for decrementing a count of torque converter events.

FIG. 8 illustrates calibrated delay periods indexed to the current count of torque converter events.

DESCRIPTION OF THE PREFERRED EMBODIMENT

Figure 1:
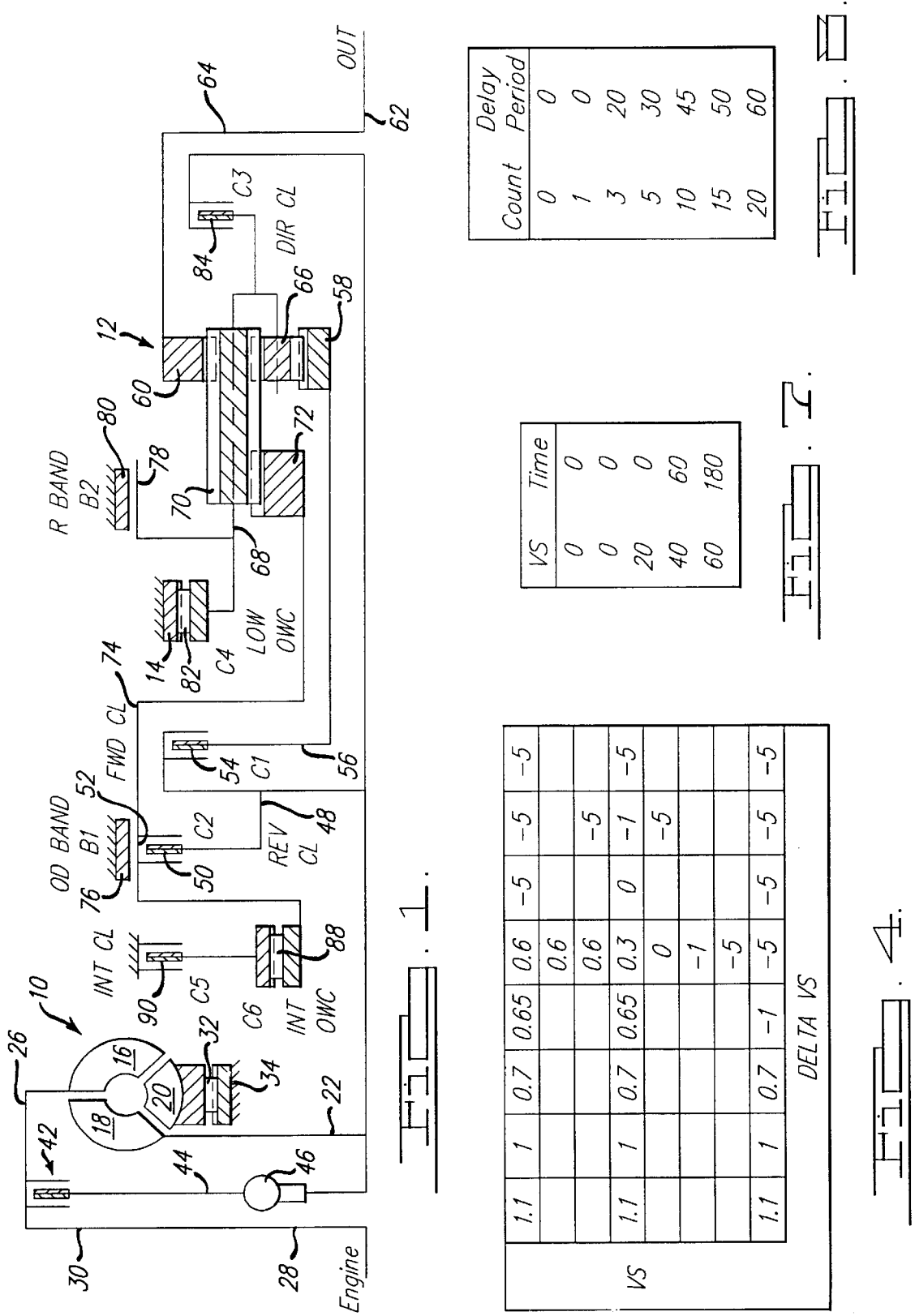
FIG. 1 is a schematic diagram of the kinematic arrangement of the transmission adapted for use with the present invention.
Figure 2:
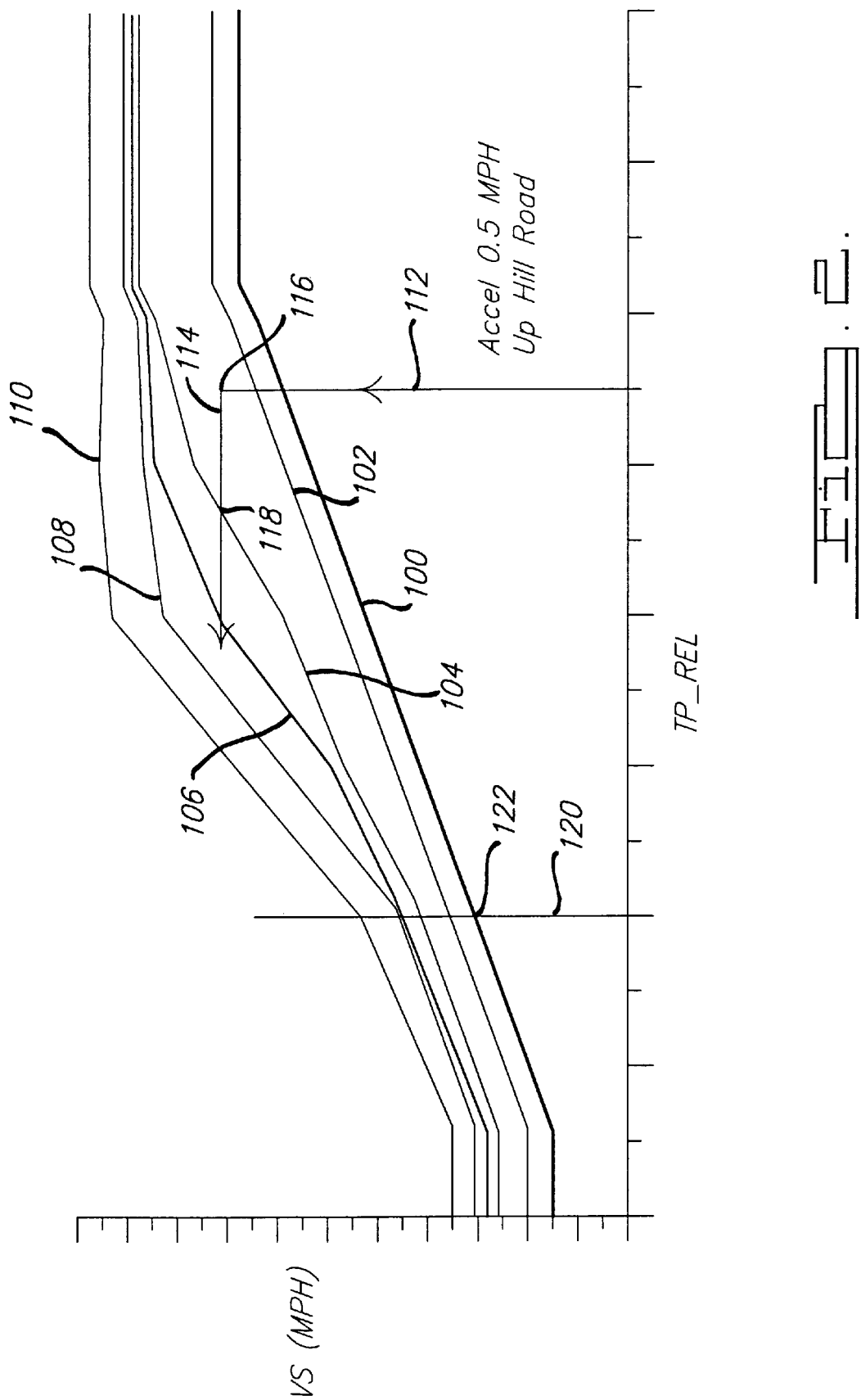
FIG. 2 is a graph of a predetermined upshift schedule having vehicle acceleration shown as a parameter.

In the cross sectional view of the transmission seen in FIGS. 1 and 2, numeral 10 designates a hydrokinetic torque converter and numeral 12 designates a compound planetary gear unit. The converter 10 and the gear unit 12 are located in a transmission housing.

The converter 10 includes a bladed impeller 16, a bladed turbine 18 and a bladed stator 20. The converter elements 16, 18 and 20 form a torodial fluid flow path in known fashion, whereby impeller torque is multiplied hydrokinetically to produce a turbine torque that is transmitted through turbine hub 22 to the turbine shaft 24. The impeller is enclosed within an impeller housing 26, which is connected at 28 to an engine crankshaft through the hub of a drive plate 30, the latter being secured to the outer periphery of the impeller housing 26.

Stator 20 is mounted on a one-way brake 32 and is supported by stationary turbine sleeve shaft 34.

A torque bypass clutch generally shown at 42 includes a clutch plate 44 adapted to engage the adjacent wall of the impeller housing 26. It is secured to turbine hub 22 by means of a damper assembly 46. Fluid is distributed radially outward through the space between the clutch plate 44 and the adjacent wall of the impeller housing when the clutch is disengaged. The converter at that time acts as an open converter and is capable of multiplying torque hydrokinetically. Fluid is supplied continuously to the torodial cavity of the converter, and the pressure thus developed applies the clutch by engaging the clutch plate 44 against the adjacent frictional surface of the impeller housing. The radial outward flow through the space between the plate 44 and the adjacent wall of the impeller housing is interrupted when the clutch is applied.

Torque delivered to the turbine shaft 24 is transferred through the turbine shaft to the torque input side 48 of a reverse clutch 50 and to the torque input side 52 of forward clutch 54. The output side 56 of the forward clutch 54 is connected to sun gear 58 of the planetary gear unit 12. A ring gear 60 of the gear unit 12 is connected to a torque output shaft 62 through torque transfer member 64.

Sun gear 58 engages a first set of planet pinions 66 supported on carrier 68. Pinions 66 engage companion pinions, 70 which also mesh with the ring gear 60. Pinions 70 mesh with a second sun gear 72. The torque output side of the reverse clutch 50 is connected to sun gear 72 through torque transfer member 74. A brake band 74 forms a part of the torque output portion of reverse clutch 50. The brake band 76 for drum 74 is applied during overdrive operation to anchor the sun gear 72.

Carrier 68 journals both sets of pinions 70 and 66 and is connected to reverse brake drum 78. Brake band 80 surrounds brake drum 78 and is applied during reverse drive operation. An overrunning brake 82 anchors the carrier 68 during operation in the first speed ratio as forward drive reaction torque is delivered to the housing 14.

Carrier 68 is releasably connected to the turbine shaft 24 through direct-drive clutch 84.

Brake drum 74 is connected to the inner race of an overrunning brake 88. The outer race 86 is braked by friction brake 90 to the transmission housing 14. When brake 90 is applied, overrunning brake 88 is adapted to deliver reaction torque to the housing through friction brake 90 during intermediate ratio operation.

For a particular description of the mode of operation of the transmission of FIG. 1, reference may be made to U.S. Pat. No. 4,934,216.

FIG. 1 carries the symbol B1 to identify the overdrive brake band 76, the symbol B2 to identify the reverse brake band 80, the symbol C1 to identify the forward clutch 54, the symbol C2 to identify the reverse clutch 50, the symbol C3 to identify the direct and overdrive clutch 84, the symbol C4 to identify the overrunning brake 82, the symbol C5 to identify the intermediate clutch 90 and the symbol C6 to identify the overrunning brake 88.

During operation in the first gear ratio in the automatic drive mode, clutch C1 is applied and brake C4 is applied. Torque is delivered to the turbine shaft 24, and then it is transferred through the clutch C1 to the sun gear 58. The carrier 68 acts as a reaction member since it is braked by brake C4. Thus, the ring gear 60 is driven in a forward driving direction with the highest torque multiplication ratio. If coast-braking is desired (manual range), brake band 80 is applied, thus transmitting the reaction torque to the housing 14 in a reverse driving direction.

An upshift to the second ratio is achieved by applying intermediate brake C5. This permits the sun gear 72 to act as a reaction point and the overrunning brake C4 begins to overrun. Torque is distributed to the housing through the brake C5 and through the overrunning brake C6.

An upshift of the third ratio from the second ratio is achieved by engaging direct-drive clutch C3 while clutch C1 remains applied. Thus, all of the elements of the gearing then are locked together for rotation in unison.

Fourth ratio is achieved by releasing clutch C1 and applying brake band B1. Sun gear 72 then acts as a reaction point as the input torque is delivered through the clutch C3, thus overdriving the ring gear 60.

Reverse drive is obtained by applying brake band 80 thus anchoring the carrier. Engagement of the reverse clutch 50 results in torque transfer from shaft 24 to the sun gear 72. With the carrier 68 acting as a reaction member, ring gear 60 is driven in a reverse direction as sun gear 72 acts as a torque input element.

FIG. 2 shows a predetermined gear shift line 100 relating vehicle speed VS and relative throttle position TP_REL for a 2–3 upshift. The coordinates of the points of line 100 are the current throttle position and the corresponding vehicle speed that must be attained before a control algorithm can produce a command to upshift from the second to the third gear ratio.

A calibratable parameter, upshift vehicle acceleration, is determined empirically before a shift control algorithm is used to determine whether an upshift should be enabled according to this invention. Calibration is best conducted above sea level, on an inclined road of substantial constant grade of about seven percent, with a vehicle speed control system operating. A vehicle equipped with a powertrain of the type to be controlled climbs the hill in a gear other than the highest gear of the transmission, at constant throttle position, beginning at about 60 mph, with a constant vehicle acceleration. Vehicle speed is continually measured at frequent intervals and differentiated over time to determine the corresponding current acceleration values.

During calibration a datafile is produced for each upshift comprising the vehicle speed, vehicle acceleration, throttle position, upshift vehicle speed at which an upshift should occur according to a predetermined shift schedule relating throttle position and vehicle speed (FIG. 2), the difference between current vehicle speed and upshift vehicle speed when the upshift occurs. Then the period during which the vehicle stays in the gear ratio following the upshift is determined and recorded. Vehicle acceleration is varied over a wide enough range to determine the values that will produce an upshift to a gear ratio that will be maintained for a period that is acceptable to the vehicle operator. If an upshift is unacceptable, the calibration test is performed again under identical conditions, except that vehicle acceleration immediately before an upshift is increased until a shift of high quality and conformance to post-shift criteria results. Calibration is repeated in this way for each of the lower gear ratios until an acceptable upshift standard is met.

Operator acceptability is determined on the basis of an index rating, or figure of merit, assigned to each upshift by members of a group of experienced drivers. Ultimately this group produces a consensus rating index indicating that each upshift is acceptable to the driving public.

A datafile containing values of vehicle acceleration, and the corresponding vehicle speed and the difference between upshift vehicle speed and current vehicle speed is determined and recorded preferably in a lookup table, as represented by that of FIG. 4. Vehicle acceleration values from the table are the preferred values corresponding to current relevant operating conditions at which an acceptable upshift will occur. These data are consulted as described below to enable and disable transmission upshifts.

In FIG. 2, lines 102, 104, 106, 108, 110, located above line 100, represent parametric vehicle acceleration values, 1.0, 0.5, 0.0, −1.0, and −5.0 mph per sec, respectively. The vehicle acceleration is another criteria, in addition to that of line 100, required to be met before a control algorithm can produce an upshift command according to the present invention. For example, line 112 represents a current engine throttle position and line 114 represents a current vehicle speed. Their intersection at 116 represents the condition at which, under a conventional control system, a 2–3 upshift command would normally issue because point 116 is above line 100. However, the additional control criteria of the present invention requires also that vehicle acceleration be satisfied. Point 116 requires a vehicle acceleration approximately midway between 1 mph per second, line 102, and 0.5 mph per second, line 104. However, current vehicle acceleration, 0.5 mph/sec, is less than the required upshift acceleration; therefore, it does not meet the vehicle acceleration criteria for a 2–3 upshift and an upshift command will not issue.

If the vehicle operator were to reduce the opening of the throttle through control of the accelerator pedal position while maintaining current vehicle speed, point 118 might represent the current operating condition rather than point 116. Under the conditions represented by point 118, a backout upshift to the third gear ratio would be permitted under control of the present invention because the vehicle acceleration required to produce that upshift declines to 0.5 mph/sec, the condition represented by line 104.

A second operating condition, shown in FIG. 2, is defined by current throttle position, line 120, and vehicle acceleration of 2 mph/sec. In this case, an upshift to the third gear ratio is enabled to occur under the control of the present invention because vehicle acceleration exceeds the vehicle acceleration criteria, which is 1.1 mph per sec at upshift line 100. According to the present invention an upshift is enabled to occur whenever current vehicle speed exceeds the vehicle speed coordinate of point 122, provided current vehicle acceleration is greater than 1.1 mph per sec.

From this discussion, it can be seen that the closer current vehicle speed is to the upshift vehicle to speed of points on line 100, the higher the required current vehicle acceleration is in order to enable an upshift to occur. This technique greatly reduces the amount of gear shifting due to excessive throttle movement, which typically occurs on roads with rolling hills and curves. The strategy uses relative throttle position to determine the required vehicle acceleration for an upshift.

A gear hunting reduction method according to the present invention uses the difference between current vehicle speed and a speed at which an upshift to the next higher gear ratio should take place. This difference is used as a criteria to determine the current vehicle acceleration required to permit an upshift to the next highest gear ratio.

A gear shift scheduling algorithm for determining whether to disable or enable an upshift, according to the present invention, is executed before a shift control algorithm, which receives the output produced by the gear shift scheduling algorithm. An upshift command may result upon execution of the shift control logic, but only if the upshift has been previously enabled.

Figure 3:
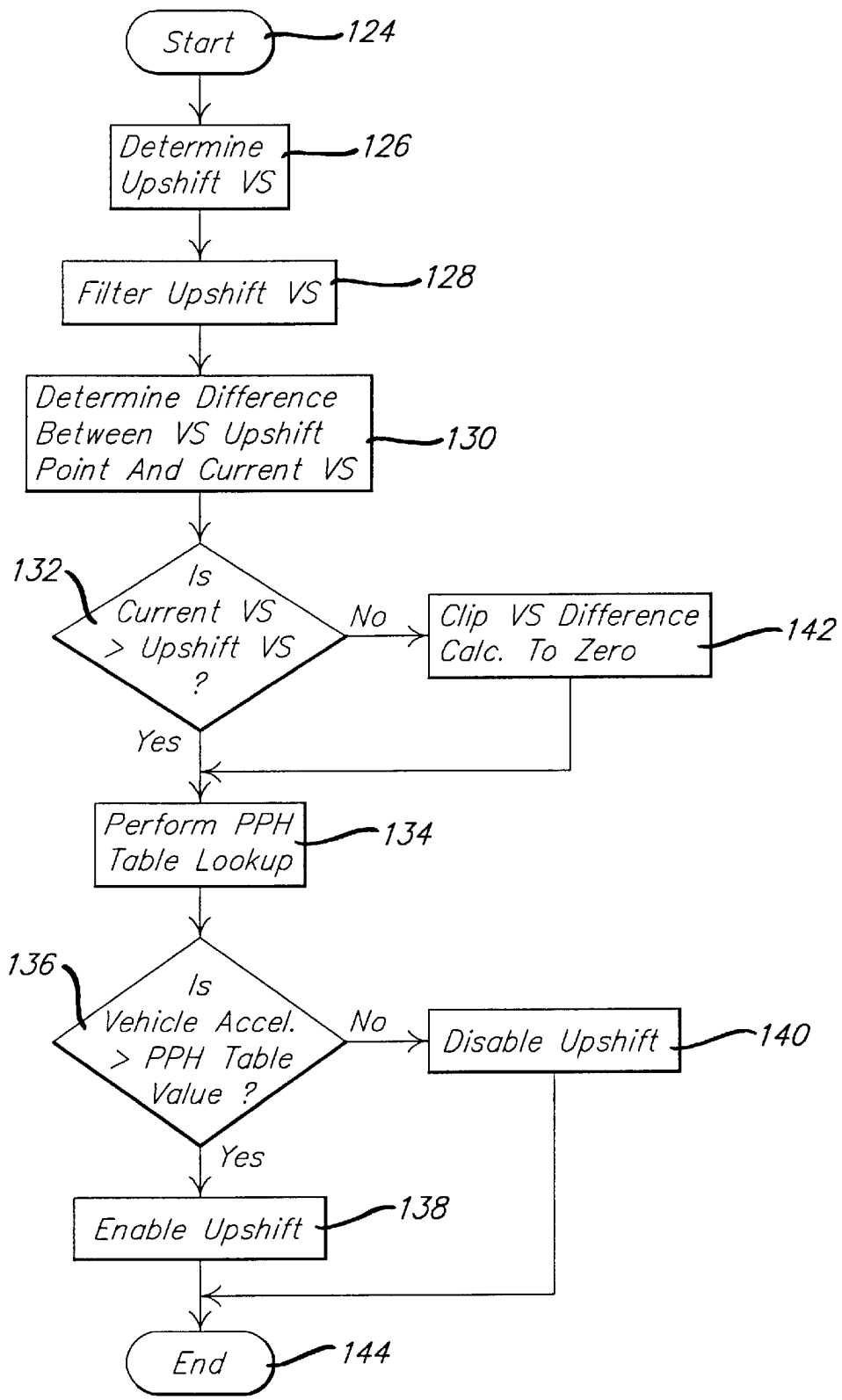
FIG. 3 is a diagram of shift control logic for enabling and disabling an upshift of the transmission of FIG. 1.

A method employing this invention is described next with reference to FIG. 3. Gear shift scheduling begins at step 124, whereafter at 126 an upshift vehicle speed is determined with reference to the current throttle position, preferably from a gearshift schedule such as line 100 for an upshift from the current gear ratio. At 128 the upshift vehicle speed is filtered through a rolling average, first order filter, by producing a weighted average of the vehicle speed, e.g., by adding 0.60 times the current upshift vehicle speed and 0.40 the immediately preceding upshift vehicle speed.

At 130 the difference between the current vehicle speed and the current upshift vehicle speed is determined. At 132, a comparison occurs to determine whether the current vehicle speed is greater than the current upshift vehicle speed. If the result of the comparison at 132 is true, control passes immediately to 134. If the result of the comparison at 132 is false, the vehicle speed difference determined at 130 is set equal to zero at 142, and control passes thereafter to 134. The shift control algorithm ends at 144. At 134 a calibrated parameter, upshift vehicle acceleration, is produced from a table like FIG. 4, whose contents are indexed according to current vehicle speed and the vehicle speed difference determined at 130.

The vehicle speed upshift curve 100 is determined with reference to the current throttle position. At 128 the upshift vehicle speed is filtered, preferably through a rolling average first order filter, e.g., by producing weighed average of the most recent vehicle speed, which may be multiplied by 0.60, and the immediately preceding upshift vehicle speed, which may be multiplied by 0.40.

At 136 a comparison is made to determine whether actual vehicle acceleration is greater than the upshift vehicle acceleration value acquired from the table. If that comparison is true, a signal is produced at 138, such as setting or resetting of an upshift flag, which is passed from the shift control algorithm, described here, to a gear shift scheduling algorithm. Then if the conditions for commanding an upshift are present, an upshift is executed in response to the command. However, if the comparison at 136 is false, the shift control algorithm disables the upshift at 140 by setting or resetting a flag to indicate that an upshift to the next gear ratio should occur.

Figure 5:
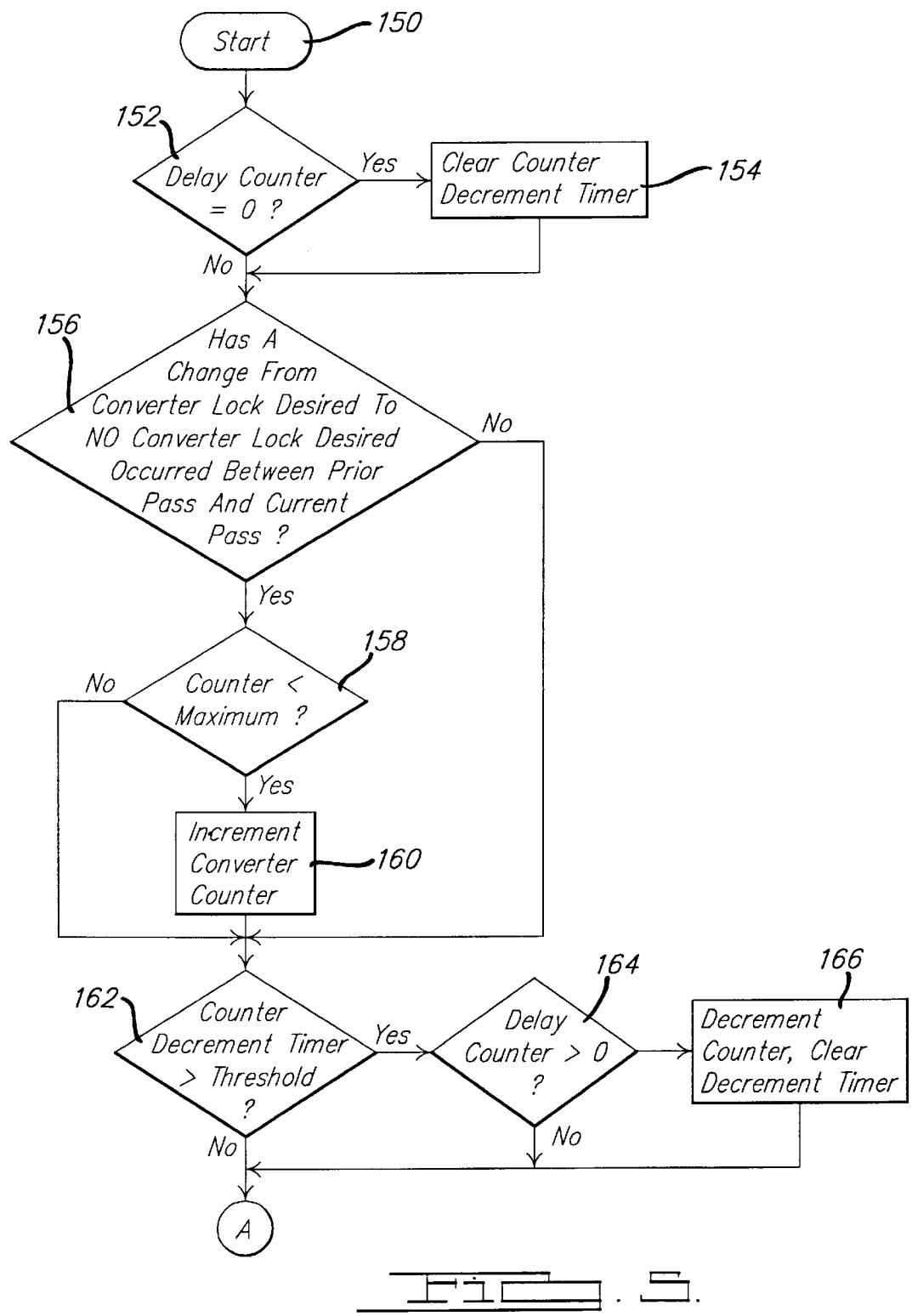
Figure 5:
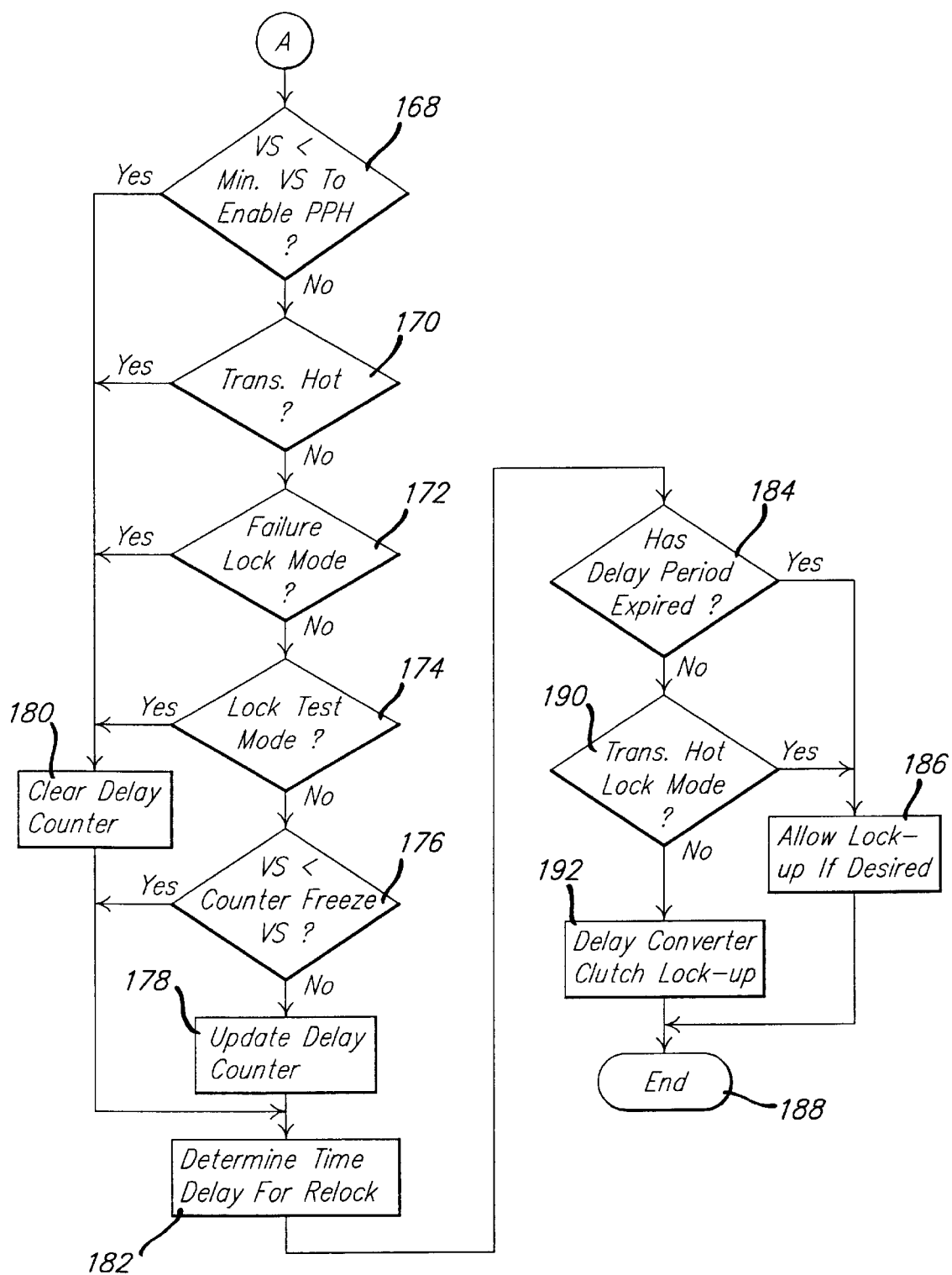

A control algorithm for preventing excessive torque converter bypass clutch activity is discussed next with reference to FIGS. 5 and 6. At 152 a check is made to determine whether the count of bypass clutch relocks maintained in a delay counter is equal to zero. If the result of this test is true, a counter decrement timer is cleared, i.e. set equal to zero, at step 154. The counter decrement timer counts time since the last clutch relock. If the comparison at 152 is false, control passes to step 156 where an inquiry is made to determine whether, between the immediately preceding execution of this control algorithm and its current execution, a change from an operating condition in which the converter bypass clutch is desired to be locked to a condition in which there is no desire to lock the converter bypass clutch has occurred. If the check at 156 is true, control passes to 158 to determine whether the delay counter contains less than a maximum value, which is a calibratable parameter of the maximum count of torque converter bypass clutch lock events. Preferably, the maximum value is 50 such events.

If the check at 158 is true, at 160 the converter event counter is incremented by one count and control passes to 162.

If the check at step 156 is false, control passes immediately to 162. Similarly, if the check at 158 is false, control passes to 162.

FIG. 7 represents data contained in a timer for decrementing the counter with reference to vehicle speed, the timer delay period, being a calibratable parameter. The left-hand column of FIG. 7 represents the current vehicle speed, and the right-hand column shows corresponding delay periods expressed in seconds.

At 162 a check is made to determine whether the current time value in the counter decrement timer is greater than the threshold delay time corresponding to current vehicle speed determined from the timer of FIG. 7. If this comparison is true, at 164 a check is made to determine whether the count in the delay counter is greater than zero. If the check at 164 is true, the counter is decremented by one count and the decrement timer is cleared at 166. If either 162 or 164 is false, or upon execution of 166, this portion of the control ends.

The bypass clutch control begins at 168 where a check is made to determine whether current vehicle speed is less than the minimum vehicle speed, preferably about 30 mph, required to enable the output of this control algorithm to affect the operation of the torque converter bypass clutch. In addition, a check is made at 170 to determine whether the transmission fluid temperature is hot, at 172 to determine whether the transmission is operating in a failure lock mode, and at 174 to determine whether the transmission is in a lock test mode. If each of the checks 168, 170, 172, and 174 is false, control passes to 176 where a check is made to determine whether current vehicle speed is less than a minimum vehicle speed where the torque converter event counter holds or freezes the current count without change. The vehicle speed at which the count in the event counter is held fixed is a calibratable parameter, preferably about 35 mph.

If each of the checks 168–176 is false, at 178 the count of the delay counter is updated in accordance with the control described with reference to FIG. 5, and control passes to 182. If any of the checks 168–174 is true, the delay counter is cleared at 180 and control also passes to 182.

FIG. 8 represents a function for delaying bypass clutch lockup. The function is indexed by the number of torque converter bypass clutch events stored in the delay counter. The output periods are calibratable parameters referenced to the current magnitude of the counter, represented by the left-hand column of FIG. 8. For example, if the number in the delay counter is 20, the delay period before a bypass clutch lockup can be enabled is 60 seconds from the occurrence of the last event. Preferably, the first converter bypass clutch relock following a gear ratio change, either an upshift or downshift, does not change the count of the delay counter.

The delay period is determined at 182. Then a check is made at 184 to determine whether the delay period has expired. If the delay period has expired, lockup of the torque converter bypass clutch is enabled at 186, preferably by setting an appropriate flag. Execution of the control algorithm ends at 188. However, if the delay period has not expired, checks are made at 190 to determine again whether the transmission fluid temperature is sufficiently high and if the transmission is in the failure lock mode. If both of these conditions are true, lockup of the bypass clutch is enabled at 186. However, if either of these conditions is false, at 192 a lockup of the torque converter bypass clutch is disabled by setting an appropriate flag. The current execution of the control algorithm ends at 188.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A method for controlling a gear ratio change in an automatic transmission adapted for use with an engine having a throttle, comprising the steps of:

determining the current throttle position, current vehicle speed, and current vehicle acceleration;

determining an upshift vehicle speed corresponding to current throttle position at which an upshift from the current gear may occur;

determining a speed difference between current vehicle speed and said upshift vehicle speed;

if current vehicle speed is greater than the upshift vehicle speed, determining an upshift vehicle acceleration corresponding to said speed difference and current vehicle speed;

if the upshift vehicle acceleration is greater than the current vehicle acceleration, enabling an upshift to occur; and if the upshift vehicle acceleration is not greater than the current vehicle acceleration, preventing an upshift.

2. The method of claim 1 wherein the step of determining an upshift vehicle speed further comprises the step of determining a weighted average of the current upshift vehicle speed and a prior upshift vehicle speed.

3. The method of claim 1 further comprising wherein the step of enabling an upshift to occur includes determining whether the upshift vehicle acceleration is equal to or greater than the current vehicle acceleration.

4. A method for controlling a upshift in an automatic transmission adapted for use with an engine having a throttle, comprising the steps of:

determining the current throttle position, vehicle speed, and vehicle acceleration;

defining an upshift schedule relating throttle position and vehicle speed at which an upshift from the current gear ratio may occur provided current vehicle speed equals or exceeds the vehicle speed from the upshift schedule that corresponds to the current throttle position;

determining from the upshift schedule an upshift vehicle speed corresponding to the current throttle position;

determining a speed difference between current vehicle speed and said upshift vehicle speed;

empirically determining an upshift vehicle acceleration for the upshift corresponding to said speed difference and current vehicle speed, at which an acceptable upshift to the next higher gear ratio would result;

if current vehicle speed is greater than the upshift vehicle speed, determining an upshift vehicle acceleration corresponding to said speed difference and current vehicle speed;

if the upshift vehicle acceleration is greater than the current vehicle acceleration, enabling an upshift to occur; and if the upshift vehicle acceleration is not greater than the current vehicle acceleration, preventing an upshift.

5. The method of claim 4 wherein the step of determining an upshift vehicle speed further comprises the step of determining a weighted average of a current upshift vehicle speed and a prior upshift vehicle speed.

6. The method of claim 4 further comprising wherein the step of enabling an upshift to occur includes determining whether the upshift vehicle acceleration is equal to or greater than the current vehicle acceleration.

7. A method for controlling upshifts in a multiple-speed automatic transmission adapted for use with an engine having a throttle, comprising the steps of:

determining the current throttle position, vehicle speed, and vehicle acceleration;

defining an schedule for each upshift relating throttle position and vehicle speed at which an upshift from the current gear ratio may occur, provided current vehicle speed equals or exceeds the vehicle speed for the schedule that corresponds to the relevant upshift and current throttle position;

determining from the relevant schedule an upshift vehicle speed corresponding to the current throttle position;

determining a speed difference between current vehicle speed and said upshift vehicle speed;

empirically determining upshift vehicle acceleration values for each upshift, said vehicle acceleration values corresponding to a range of speed difference values and a range of current vehicle speed values, at which an acceptable upshift to the next higher gear ratio would result;

if current vehicle speed is greater than the upshift vehicle speed, determining an upshift vehicle acceleration corresponding to said speed difference and current vehicle speed;

if the upshift vehicle acceleration is greater than the current vehicle acceleration, enabling an upshift to occur; and if the upshift vehicle acceleration is not greater than the current vehicle acceleration, preventing an upshift.

* * * * *